US010442485B2

(12) United States Patent
Applegate (10) Patent No.: US 10,442,485 B2
(45) Date of Patent: Oct. 15, 2019

(54) METHOD OF AND APPARATUS FOR OPERATING A BRAKE LIGHT AND TURN SIGNAL (71) Applicant: Alex Applegate, Albuquerque, NM (US)

(72) Inventor: Alex Applegate, Albuquerque, NM (US)

(73) Assignee: Alexander Applegate, Albuquerque, NM (US)

( * ) Notice: Subject to any disclaimer, the term of this patent is extended or adjusted under 35 U.S.C. 154(b) by 0 days.

(21) Appl. No.: 14/815,943

(22) Filed: Jul. 31, 2015

(65) Prior Publication Data
US 2017/0029056 A1 Feb. 2, 2017

(51) Int. Cl.
B62J 6/04 (2006.01)
B62J 6/00 (2006.01)

(52) U.S. Cl.
CPC ............ B62J 6/001 (2013.01); B62J 6/005 (2013.01); B62J 6/04 (2013.01); B62J 2006/008 (2013.01)

(58) Field of Classification Search
CPC ..... B62J 6/001; B62J 6/005; B62J 6/04; B62J 2006/008
USPC ............ 362/473, 475, 476; 340/432, 438
See application file for complete search history.

(56) References Cited

U.S. PATENT DOCUMENTS

| 8,952,793 | B2* | 2/2015 | Nishihara | B62K 23/02 340/12.39 |
| 2001/0011809 | A1* | 8/2001 | Fukuda | B62M 9/122 280/618 |
| 2008/0114519 | A1* | 5/2008 | DuFaux | B60T 7/16 701/70 |
| 2009/0315692 | A1* | 12/2009 | Miki | B62K 23/02 340/432 |
| 2011/0074568 | A1* | 3/2011 | Li | B62J 6/04 340/479 |
| 2015/0151672 | A1* | 6/2015 | Hsu | B60Q 1/2615 701/45 |
| 2015/0314823 | A1* | 11/2015 | Woram | B62J 6/04 340/432 |
| 2016/0297490 | A1* | 10/2016 | Containne | B62J 6/001 |

* cited by examiner

Primary Examiner — Hai Phan
Assistant Examiner — Anthony D Afrifa-Kyei
(74) Attorney, Agent, or Firm — Diane E. Albert (57) ABSTRACT The present invention provides an apparatus for and method of bicycle signaling. The present invention provides an ease of setup on a wide variety and style of bicycle handlebars providing a magnet disposed on a bicycle brake lever and a control unit comprising sensors, also disposed on the bicycle handlebars. The present invention provides a wireless signaling apparatus and a wireless method of signaling.

The present invention provides an apparatus and method for easy configuration and pairing of a bicycle light system. The present invention system provides for a plurality of lights that are configured and able to function independently in different patterns, including but not limited to a left turn signal, and a right turn signal, thus providing a wide array of pattern visibility and patterns that motor vehicle drivers are expecting to see.

15 Claims, 7 Drawing Sheets

METHOD OF AND APPARATUS FOR OPERATING A BRAKE LIGHT AND TURN SIGNAL

CROSS-REFERENCE TO RELATED APPLICATIONS

This application claims the benefit of U.S. Provisional Application No. 62/031,845 filed Jul. 31, 2014 and the entire content is incorporated by reference herein and made part of this specification.

FIELD OF THE INVENTION

The present invention provides a signal system for and a method of increasing bicyclists' safety and predictability, the system comprising a control unit and a display unit. The display unit comprises brake light display and bicycle turn signal features that are mounted on a bicycle. The present invention provides a radio frequency (RF) link between the control unit and the display unit, and provides for the actuation of the brake light function by utilizing an easily calibrated magnetic field. The present invention provides a system comprising a capability of multiple display units that are RF linked and thus provides for simultaneous operation of the units, resulting in an increase in signal visibility and therefore increased safety for all roadway users.

BACKGROUND OF THE INVENTION

The present invention improves on previous devices and methods known to those having ordinary skill in the art of bicycle signal systems. All previous devices and methods providing a display of the bicycle rider's intentions had the requirement of placing a wire assembly between a control unit mounted on the handlebar of the bicycle and the display unit on the rear of the bicycle. Additionally, brake lever actuation had to be accomplished by mechanical switches that required mechanical adjustment and complicated placement strategies of the braking mechanisms or brake wire.

The present invention provides a vast improvement over systems used currently. The present invention comprises an apparatus for and a method of controlling a bicycle turn signal combined with a bicycle brake light display unit by means of an RF link, and a method for sensing and actuating a bicycle brake signal and turn signal display function. The method of actuating the bicycle brake signal and turn signal provides for the present invention to easily be fitted to almost any style, brand, or configuration of bicycle or bicycle handlebars.

The system for and method of the present invention provides a user the ability to actively control his/her bicycle taillight comprising a turn signal and a brake signal, while actively pedaling his/her bicycle. Commonly used taillights that are presently being manufactured and sold are pre-set before the bicycle rider begins to bicycle, and, at the point of commencing the ride, cannot be changed until the bicyclist stops, dismounts the bicycle, and changes the taillight setting. The present invention is thus a major improvement over presently used bicycle light devices and systems and methods of signaling by providing an RF control unit which sends real time signals to the taillight.

The method of use provided by the present invention system comprises the following steps. Initially, a bicyclist activating a switch on the control unit sends either a left or right turn signal to the bicycle turn signal unit and then subsequently the operator pressing the switch again cancels the bicycle turn signal. Disposing and installing a magnet on the bicycle's brake lever and subsequently actuating the lever causes the magnetic field produced by the presence of the magnet to activate the sensors in the system's control unit which subsequently informs the system's control unit to send the signal to the taillight unit to initiate the braking pattern.

The present invention system sends an RF signal to the taillight unit commanding the taillight unit (the taillight unit comprises a braking and turning indicator unit) to revert to an existing programmed operational mode. This real time transfer of data to the taillight unit and the ability to change the taillight display allows the bicycle to perform and appear similar to a motorized vehicle, illustrating traffic reactions via the system provided by the present invention, that operators of motor vehicles are used to seeing in patterns the motor vehicle operators and bicycle operators understand.

The LED patterns that are a feature of the present invention are divided into two groups, i.e. active patterns and passive patterns. Twelve (12) Light Emitting Diodes (LEDs) provide various light patterns designed to accent the active braking and form the arrow shape that makes the turn signal. The passive patterns have been designed around the placement of the twelve (12) LEDs, and increasing governmental regulations, which now require that at least one LED be operating at all times. The present invention comprises an apparatus that provides patterns ranging from slow pulsing random lights which conserver batteries, to high intensity, quickly flashing patterns that display a great lumen output, but which more quickly consume the batteries.

The present invention provides a method of an active mode of providing a signal system for bicyclists. The active mode provides for multiple lights to be configured or chained together wirelessly, allowing an expansion of use. The bicycle taillights are configured to run in multiple patterns to take advantage of this interconnection. One light is configured to be a left turn signal and when the bicyclist turns left, the left turn signal activates.

However, when a bicyclist turns right, only the brake light activates when depressed. When the left turn is activated when the bicyclist depresses the left turn light, the second right configured light then indicates a right turn signal, but when the left turn signal is indicated, this second light only displays the braking pattern when depressed. Pairing the brake light with another light that is configured as a right turn signal, then, allows one of the lights to display the direction of the turn, while the other shows that the bicycle is braking. One other active mode expands on the method of the present invention. In this mode, the light is set to be a brake light only. This deactivates the turn signal on it, and the light is only active when the brake lever is pressed. This is used as a third light with a left/right combination, again increasing the chance that the bicyclist's presence will be seen by motorists and other bicyclists.

The present invention also provides a passive mode method of use. When the present invention light is not braking, the light displays one of the passive modes. These passive modes are described in the Operating/Flashing modes listed below in Table 1. By varying these modes on different lights, the different patterns may increase driver awareness of your presence. The taillight comes with 5 different operational modes, plus an off mode. To select a mode, briefly press the button on the back of the taillight. The modes immediately begin to display.

The present invention control unit is also paired with multiple taillights. To pair the control unit and taillight (or additional taillights to the same control unit) press the switch on the back of the taillight and then either of the switches on the control unit. A single light on the taillight flashes, informing that the light has been set. This function is tested by then pressing any button on the control unit to see the taillight respond.

A braking and turn signal pattern is assigned by pressing and holding the button on the back of the taillight for ten seconds. The light emits a beep and displays the mode in which it is set. The button is pressed and held for an additional ten seconds, taking the taillight to the next mode and so on.

TABLE 1

Operating/Flashing Modes

| | |
|---|---|
| Mode 1 | Slow Flash of 5 LEDs. Two lights will always remain on in this mode. Note: All 12 lights illuminate only during braking to distinguish between a non-braking and braking taillight. |
| Mode 2 | No flashing lights. This daylight mode will be indicated by the brief flash of a single LED light. Lights will only be activated by the control unit. ///Is this the same as braking?/// |
| Mode 3 | Random flash. In this mode, two LEDs will always remain operational, but all lights around them will randomly flash on or off, providing the second lowest operational light. |
| Mode 4 | Patterned flash. In this mode, two LEDs will always remain operational, but the lights surrounding it will fire in a consecutive circular pattern. |
| Mode 5 | All twelve LEDs lit. |
| Off Mode | The bicycle remains motionless for a half hour, the light automatically shuts off. |

The light switches between one of four modes as follows: brake and two directional turn signal (factory default setting); brake and left turn signal; brake and no turn signal; brake and right turn signal.

The present invention comprises a method of controlling a bicycle turn signal and brake light display unit by means of a radio frequency link, and a simple method of sensing and actuating the bicycle brake signal display function. This allows the unit to easily be fit to almost any style of bicycle or bicycle handlebars.

The present invention also comprises a method for pairing multiple display units to a single control unit to increase the effectiveness of the brake light and turn signal to the rear of the bicycle, thus increasing the safety factor of this signaling device.

The present invention further comprises a method of sensing idle operation of the display unit, allowing the power to be automatically turned off after several minutes of a stand-by state, and thus extending the battery charge of the display unit.

SUMMARY OF THE INVENTION

The present invention comprises a system for signaling comprising a control unit comprising sensors, a display unit, and a wireless connection between said control unit and said display unit. The present invention further comprises the system for signaling disposed on a bicycle with a magnet disposed on a bicycle brake lever wherein the control unit comprises a magnet and the control unit is paired with the display unit and wherein the display unit provides multiple light configurations.

The present invention comprises a system providing multiple light configurations comprising a right turn signal, a left turn signal, and a brake signal.

The present invention comprises a method for signaling comprising the steps of disposing a control unit on a bicycle, disposing a display unit on a bicycle, and providing a wireless connection between the control unit and the display unit.

The present invention further comprises a method wherein the signaling provides a bicyclist to signal without dismounting from the bicycle, and wherein the signaling comprises the step of pressing the control unit until the taillight beeps.

The present invention further comprises a method wherein the signaling comprises the step of the sensors disposed in the control unit sending a signal to discover the distance between a magnet and a plurality of sensors.

The present invention further comprises a method comprising a magnet that is activated by the control unit.

BRIEF DESCRIPTION OF THE SEVERAL VIEWS OF THE DRAWINGS

The accompanying drawings in the attachment, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The preferred embodiment of the present invention comprises a system and method of signaling mounted on a bicycle that provides an ease of setup on a wide variety and style of bicycle handlebars comprising a magnet mounted on a bicycle's brake lever and a control unit, comprising sensors, disposed on the handlebars. Prior art providing for wireless bicycle lights require a wire to string from a control unit and the brake lever, with one even requiring special brakes and handlebars. The present invention comprises a wireless apparatus and method of use.

The present invention provides an ease of configuration and pairing of the brake light unit and signaling unit. Pairing of bicycle light units is known, but the present invention comprising a system provides for multiple lights to be configured and each one set to function independently in different patterns. An example is to set one light to be the left turn signal, and to set another light to be the right turn signal. Thus, the present invention provides an apparatus and method to comprise a wide array of pattern visibility and patterns that drivers of motor vehicles are expecting to see.

Additionally, the control unit comprising a left/right button is operated by a user. The two buttons disposed on the control unit can be assigned as a left turn button or a right turn button. The number of positions and types of bicycle handlebars that the unit is disposed on is therefore expanded, allowing for greater versatility.

The present invention provides a method of use for providing a magnet/control unit combination that is used to shut off the turn signal. A bicyclist provides a super quick flick of the brake lever (not a controlled braking, but a quick flick of the bicyclist's fingers), that deactivates the turn signal, thus allowing the bicyclist to maintain enhanced control of a bicycle. Other units presently known and used require the button on the control unit to be pressed a second time to deactivate the signal. The present invention also operates in this fashion, but also provides for superior, new, inventive method of use and a new apparatus.

The present invention comprises a chip to transmit data. The present invention comprises units that are configured on a smart phone, and battery levels of each taillight are sent and recorded to the user's smart phone. This configuration provides the user to set the light as a right or left turn signal, and allows a customization of the flash modes of the unit. The present invention provides for the smart phone to turn on all the lights of the present invention disposed on a bicycle.

The method of use of the present invention comprises a step of configuring a control unit after it and a magnet are disposed on a bicycle The present invention comprises a method of use comprising a configuration that comprises a step of a user pressing and holding both buttons which are disposed on a control unit until the taillight "beeps" or emits a sound. The sensors in the control unit emit a signal that measures the distance of the magnet when the lever is not depressed and then measures a distance when the brake lever is activated to a closed position, and thus the brake is fully engaged on the bicycle, and the bicyclist waits to hear a second beep.

When a bicyclist hears a second beep, the bicyclist understands that the control unit has successfully measured the distance between the magnet and the sensors for when the brake is fully engaged. The programming disposed within the microchip in the control unit then calculates which of the plurality of sensors that comprise the present invention to use for that set distance. When a bicyclist hears a second beep, the bicyclist understands that the control unit has successfully measured the distance between the magnet and the sensors for when the brake is fully engaged.

Pairing of a light to a control unit is known in the prior art. The method of use of the present invention is novel, however, due to the inventive step of a user bicyclist depressing a taillight unit switch. The apparatus of the present invention waits for a modulated signal to be emitted from the control unit that contains a unique identification number programmed into the control chip at the time of its manufacture and similar ID data from the control unit. That data is stored within the taillight. This provides a method for the control unit to control a limitless number of taillights. Also, the taillight stores multiple control unit identifications, providing a method of moving the taillight from bicycle to bicycle.

The present invention provides an apparatus that comprises a transmitter disposed in the taillight. The present invention comprises a control unit that specifically controls which function the taillight displays. As a result, the taillight comprising a control unit disposed on a bicycle functions as a left turn signal. The taillight comprising a control unit when disposed on another control unit or on another bicycle functions as a right turn signal, providing for a portability of the taillight.

The present invention provides a taillight to function as something different than most systems currently known and used that employ one taillight and do not consider more than one taillight. The present invention provides a method of use where the bicyclist depresses the taillight for a set number of seconds, including but not limited to three (3) seconds, the light from the left turn signal is transitioned to a right turn signal, or to a brake signal only, or to a brake and both turn signals, which is the default setting.

In accordance with the invention, a brake indicator and turn signal indicator on the rear of a bicycle are controlled by means of a radio frequency link emanating from a control unit mounted near the brake lever of a bicycle. The control unit detects the actuation of the hand brake by a method of a change in the magnetic field in the proximity of the control unit. The magnetic field is produced by a magnet attached to the brake lever. When the brake actuation is detected, a modulated RF signal is sent to the display unit that causes the light emitting diodes or other signal indicators to activate.

The control unit also comprises push button switches to allow the bicycle rider to select a left turn condition or a right turn condition. The control unit sends the appropriate modulated RF signal to the display unit to cause the display unit to show a left turn or right turn signal, as appropriate, when one of these switches is actuated. The control unit is paired with the display unit to prevent multiple bicycle riders equipped with the same equipment from interfering with each other. Multiple display units are paired with the same control unit and placed in different locations on the bicycle to increase the visibility and effectiveness of the signal.

Figure 1:
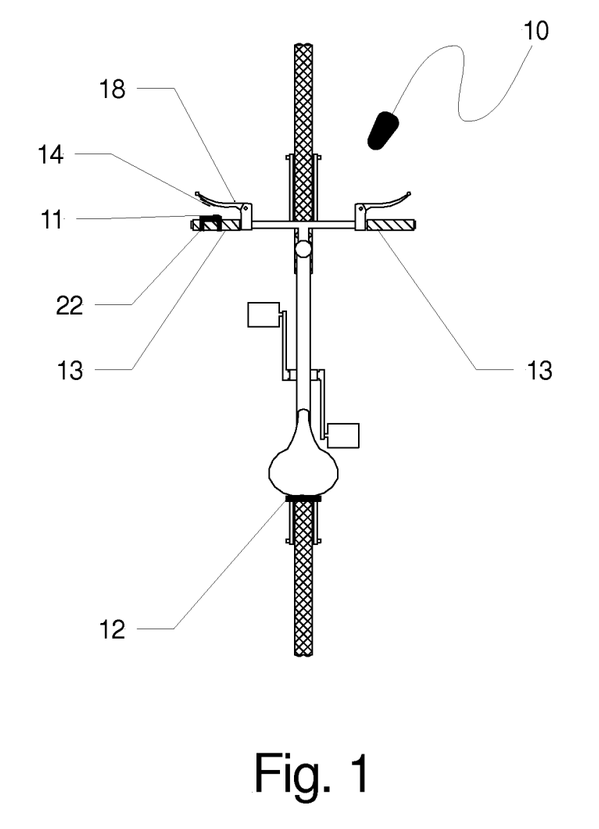
FIG. 1 is a plan view illustrating the mounting location of the control unit and a typical mounting location of the display unit, one of a number of positions of the present invention disposed on a bicycle.
Figure 5:
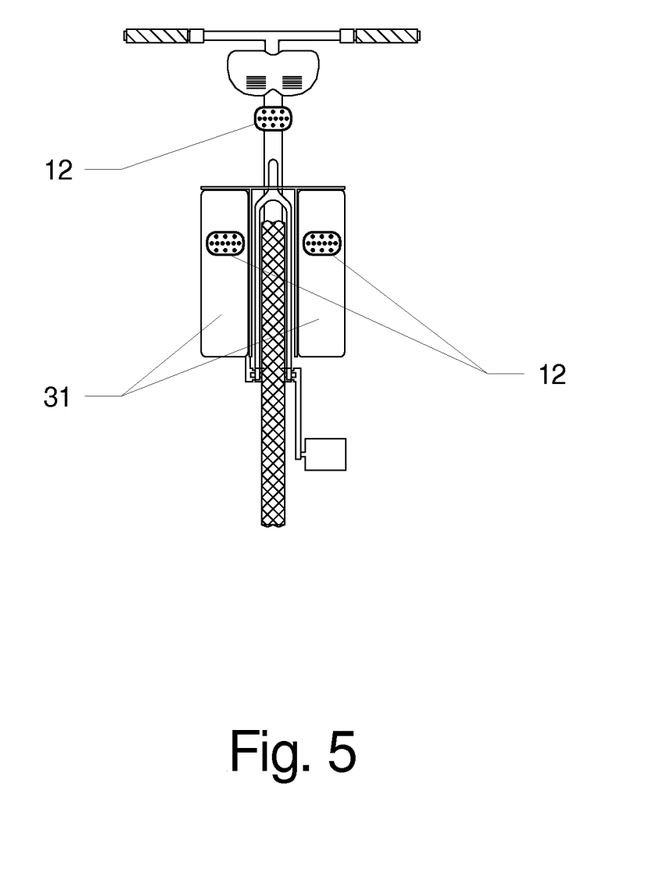
FIG. 5 is a view of paired multiple display units in several mounting locations on the rear of a bicycle.

Looking at FIG. 1, the present invention comprises the following elements. System 10 comprises display unit 12 which comprises radio frequency receiver 39 and visual signal lights 32, (see FIGS. 5 and 7) disposed on the rear of a bicycle. Display unit 12 is powered by rechargeable battery 40 (displayed in FIG. 7) or any other energy storage device. The mounting of display unit 12 is achieved in several ways, including adjustable frame mount 43 (shown in FIG. 7).

System 10 also comprises a brake signal actuation that comprises a magnet 14 disposed on brake lever 18 of a bicycle. The mounting is achieved in several ways, including using tape 21.

Figure 2:
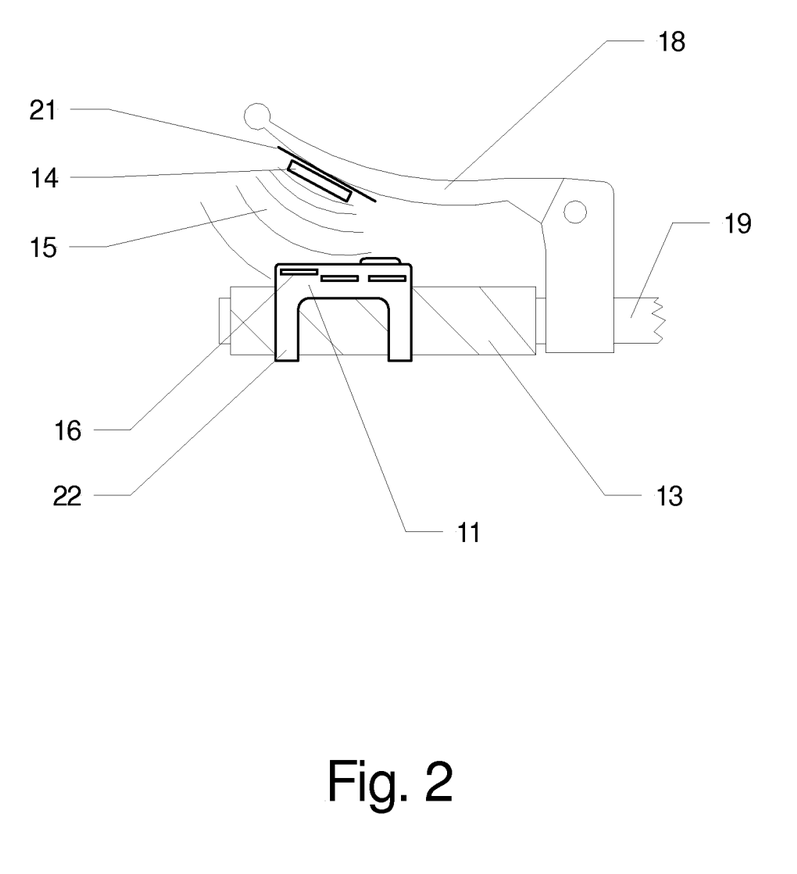
FIG. 2 is a closer view of the mounting of the control unit on the bicycle handle bar and brake signal actuation magnet on the bicycle brake lever, which displays the brake lever in a relaxed position.

Control unit 11 comprising sensors 17 (shown in FIG. 2) comprises radio frequency transmitter 28, a plurality of electromechanical switches 20 (shown in FIG. 3) for actuation of the turn signal function, and magnetic field sensors 16 of varying sensitivity. The mounting is achieved in several ways, including but not limited to employing plastic straps or zip ties 22. Control unit 11 comprising sensors 17 is powered by internal battery 28 (shown in FIG. 3). All radio frequency transmissions 27 of transmitter 28 are modulated with information containing the unique identification of control unit 11 comprising sensors 17 so that only display units 12 (shown in FIG. 1) that are paired with individual control unit 11 comprising sensors 17 respond to the radio frequency signals.

The method of operating the present invention comprises the following steps.

Figure 3:
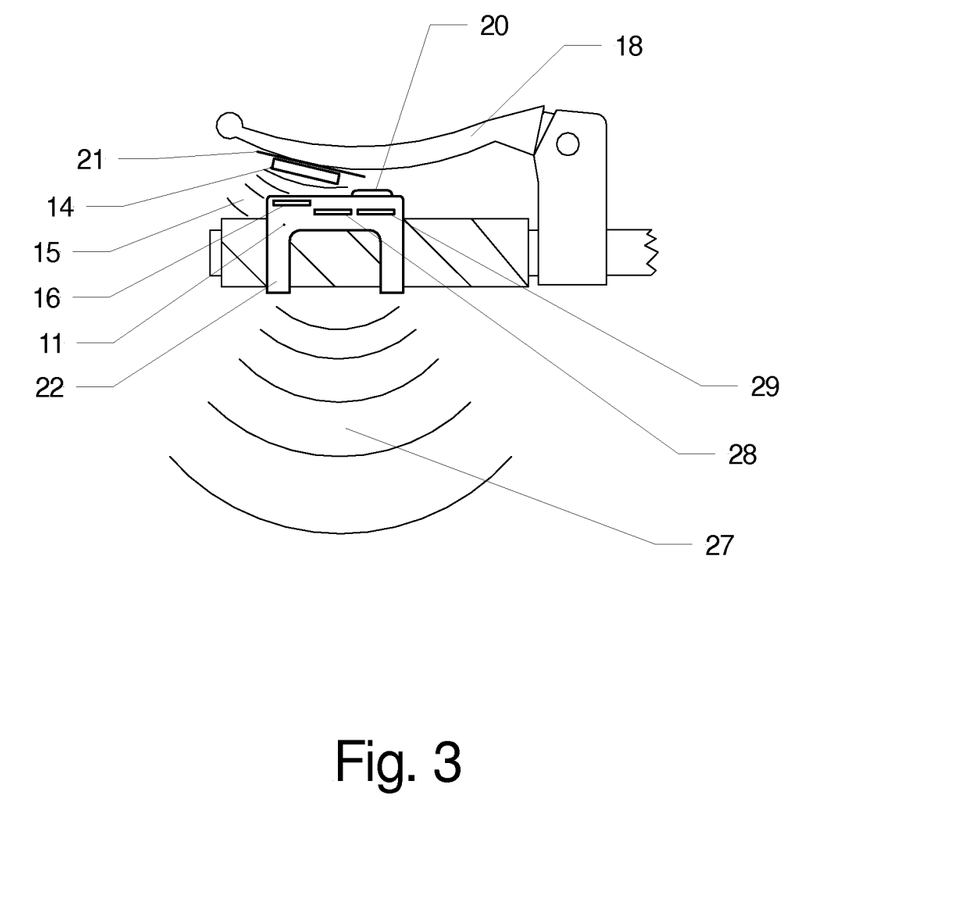
FIG. 3 is a closer view of the control unit disposed on the bicycle handle bar and the brake signal actuation magnet on the bicycle brake lever, showing the brake lever in a braking position.
Figure 4:
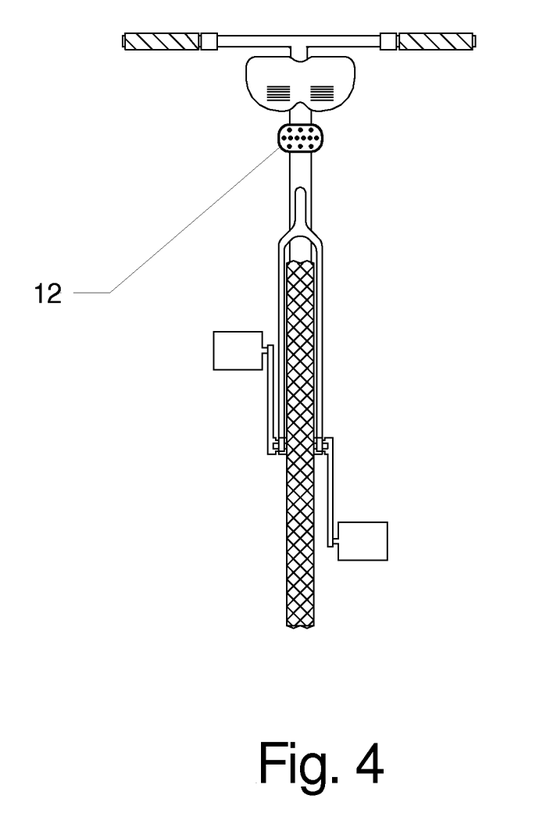
FIG. 4 is a view of the mounting of the display unit to the frame under the bicycle seat.

The brake function method comprises the following steps. The apparatus of the present invention comprising a brake element is illustrated in detail in FIGS. 2 and 3. A minimum number of magnetic sensors 16 are actuated by magnetic field 15 generated by magnet 14 mounted on brake lever 18 when brake lever 18 is in the relaxed state (all elements shown in FIG. 2). No radio frequency signal 27 is generated by radio frequency transmitter 28 (as shown in FIG. 3).

One or more magnetic sensors are actuated by magnetic field 15, (shown in FIG. 3) which has increased due to the closer proximity of magnet 14 to the sensors 17 when brake lever 18 is depressed to a braking position.

Figure 6:
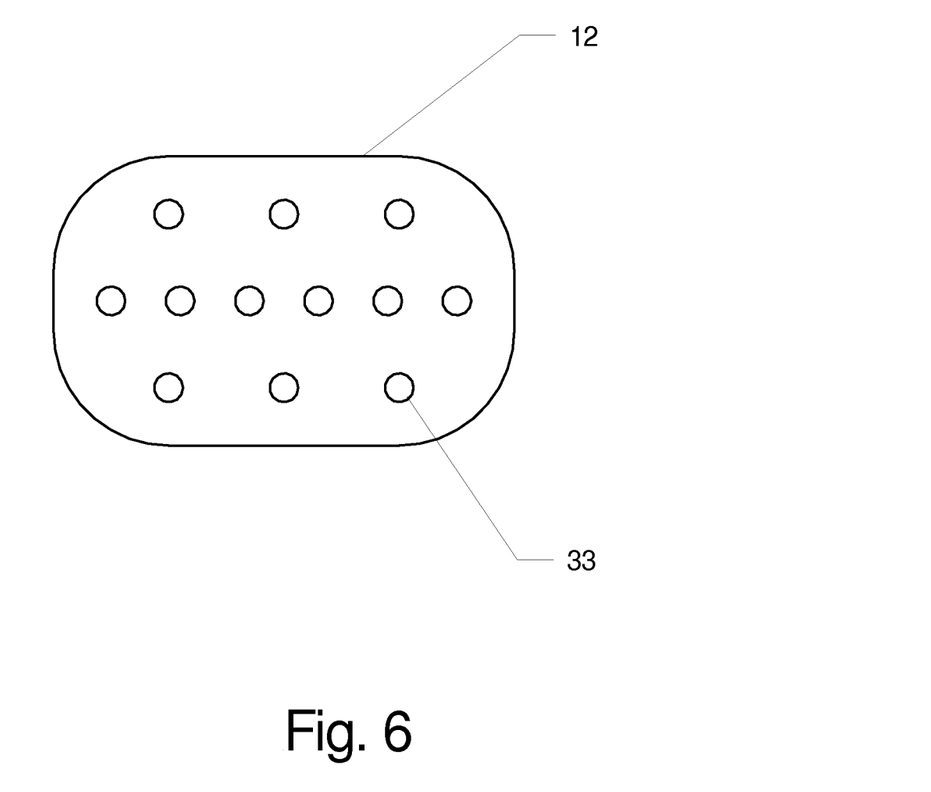
FIG. 6 is a view of a display unit displaying the locations of light emitting diodes (LEDs), in a pattern that is used for a brake, left turn, or right turn display on a bicycle.

The method of use of the present invention comprises the step of microcontroller 29 causing radio frequency transmitter 28 (FIG. 3) to broadcast a modulated radio frequency signal to display unit(s) 32 (FIG. 5) to signal the actuation of LEDs 33 (FIG. 6) as brake signals.

The turn signal function method comprises the following steps. A bicycle rider depresses one of two switches 20 (FIG. 3) to indicate the intention of bicyclist to make a left or right turn. Microcontroller 29 (Illustrated in FIG. 3) senses the switch actuation and causes radio frequency transmitter 28 to broadcast a modulated radio frequency signal to display unit(s) 32 to signal the actuation of LEDs 33 as turn signals (see FIGS. 5 and 6).

The pairing function method comprises the following steps. Each control unit 11 comprising sensors 17 and straps 22 is given a unique digital identification at a factory. Each display unit 12 is paired with control unit 11 comprising sensors 17 that is mounted on a bicycle to prevent cross-talk among control units on different bicycles from mutual interference. All modulated radio frequency signals 27 (shown in FIG. 3) broadcast to display unit(s) 32 and contain the unique digital identification code of control unit 11 and display unit(s) 12 only respond to modulated radio frequency signals 27 that contain the proper digital identification, after pairing. Pairing of sensors 17 and display unit 12 for brake light signal function will be initiated by actuating power-on switch 43 (FIG. 7) of target display unit 12.

The bicyclist subsequently presses both switches 20 of control unit 11 comprising sensors 17 for a predetermined time which places sensors 17 in brake light pairing mode as described previously. The unique digital identification code of sensors 17 along with the brake signal pairing code is broadcasted to target display unit 12. Pairing of display unit 12 to control unit 11 for brake light signal function is complete.

Pairing of control unit 11 and display unit 12 for turn signal function is initiated by actuating power-on switch 43 of target display unit 12. The method of use of the present invention then comprises the step of pressing both switches 20 of control unit 11 for a predetermined time to place control unit 11 in turn signal pairing mode. The predetermined time is significantly longer than the time required for the other function, which is brake signal pairing.

The method of use of the present invention then comprises the step of a bicycle rider choosing switch 20 to designate as a right or left turn signal and actuating switch 20. Control unit 11 broadcasts the unique digital identification code of control unit 11 along with the right or left turn signal pairing code to target display unit 12. Pairing of display unit 12 to control unit 11 for right or left turn signal function is then complete.

The brake threshold set point configuration function comprises the following steps. Due to a wide range of possible mounting configurations of brake levers 18, handle bar grips 13, control unit 22 placements, and magnet 14 positions, it is necessary to configure the set point threshold of the brake light function. The unit for most bicycles does not need to be calibrated, and it operates within normal expectations.

The method of operating the present invention also comprises calibration of the brake function. Brake lever 18 is gripped by the bicycle rider into a brake stop position. With the bicyclist's other hand, the bicycle rider presses both switches 20 twice. Microcontroller 29 tests magnetic sensor array 17 (FIG. 3) and memorizes the actuated sensors of magnetic sensors 17 in this brake stop condition. The brake function is now calibrated. Microcontroller 29 uses this condition of magnetic sensors 17 to initiate the broadcast of the brake signal message of modulated radio frequency signal 27 to the display unit(s).

Figure 7:
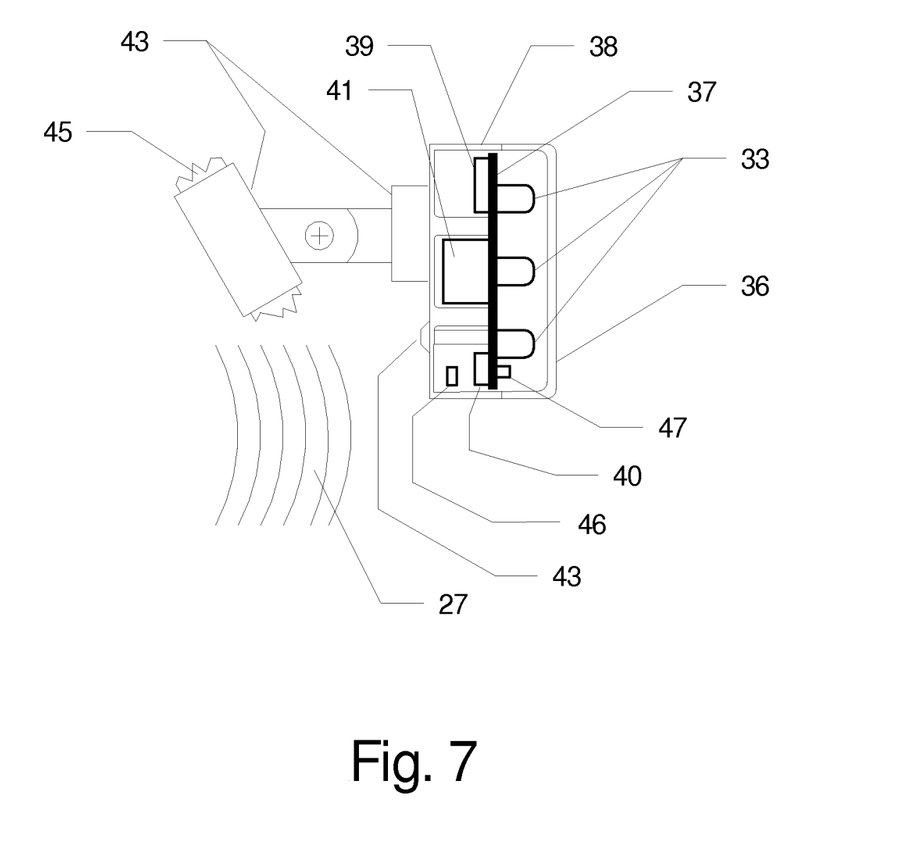
FIG. 7 is a side view of the display unit of the present invention showing the principle components.

FIG. 7 is a side view of the display unit of the present invention showing the principle components. The method of operating the present invention further comprises a method of idle state power conservation turn-off for the display unit. Accelerometer 47 is included in the electronic circuitry of display unit 12, is mechanically bonded to printed circuit board 37, and is electrically attached to microcontroller 39. Accelerometer 47 detects vibration resulting from the motion of a bicycle while the unit is powered, providing an electrical signal to microcontroller 39 to inform it that display unit 12 is on a bicycle in-use, and that display unit 12 remains in a power-on state. If accelerometer 47 does not detect vibration, the signal from accelerometer 47 drops below a pre-determined threshold, indicating to microcontroller 39 that the bicycle is not in motion. After a predetermined time, microcontroller 37 disables power to display unit 12 to conserve battery life. Power is restored to display unit 12 by manual actuation of display unit on-off switch 43.

Alternate embodiments of the method of the present invention, that achieve similar results, comprise mounting the display unit(s) on any surface visible to others on the roadway, by any means practical. The display unit is alternately mounted on the clothing or back pack of a rider, or on any fixture of the bicycle such as an accessory rack.

Alternately the display unit(s) are configured during the pairing process so that, for example, a unit mounted on the right side of the bicycle is configured exclusively as a right turn signal/brake signal, for maximum effect and visibility.

The display unit(s) are also configured during the pairing process so that the turn signal display has a variety of display sequences to indicate left or right turn signal displays, such as sequential arrows.

The system of the present invention comprises a magnet mounted on a bicycle brake lever and a control unit mounted underneath the magnet to activate the braking component of the taillight. The taillight and magnet are aligned with one another in order for the system of the present invention to operate.

Double sided tape is disposed above the system of the present invention on the brake lever. Then, with the taillight in an "on" disposition, the magnet is held against the brake lever, while the control unit is held in place. The method of using the system comprises the step of depressing the brake lever and observing if the taillight activates with minimal depressing of the brake lever. The magnet and control unit cannot touch or otherwise interfere with braking when the brake lever is depressed.

The system also is provided with two methods of attaching the light to the bicycle including a seatpost mount and a rack/seatstays mount.

Although the invention has been described in detail with particular reference to these preferred embodiments, other embodiments can achieve the same results. Variations and modifications of the present invention are obvious to those skilled in the art and it is intended to cover all such modifications and equivalents.

What is claimed is:

1. A bicycle system for signaling comprising:
a radio frequency control unit mounted on a handlebar, said RF control unit comprising sensors wherein said RF control unit measures the distance between a magnet and said sensors when a brake is fully engaged;
said magnet mounted on a brake lever wherein said magnet connects to said control unit through contactless actuation;
lights mounted anywhere on a bicycle, or on a bicyclist;
LED patterns comprising active patterns and passive patterns wherein said active patterns provide for multiple lights configured or chained together wirelessly and said passive patterns provide for one of five modes when a brake light is not on;
left turn/right turn buttons operated by a user disposed on said RF control unit to indicate turns;
a display unit mounted on any surface visible to others on the roadway; and
a wireless connection between said control unit and said display unit, wherein said wireless connection sends real time signals to the display unit.

2. The system of claim 1 further comprising a system disposed on the bicycle.

3. The system of claim 1 further comprising the magnet disposed on the bicycle brake lever.

4. The system of claim 1 wherein said control unit is paired with the magnet.

5. The system of claim 1 wherein said control unit Is paired with a plurality of display units.

6. The system of claim 1 wherein said display unit provides multiple light configurations.

7. The system of claim 6 wherein said multiple light configurations comprise a right turn signal.

8. The system of claim 6 wherein said multiple light configurations comprise a left turn signal.

9. The system of claim 6 wherein said multiple light configurations comprise a brake signal.

10. A method for bicycle signaling comprising the steps of:
mounting a radio frequency control unit on a bicycle handlebar wherein the radio frequency control unit comprises sensors;
measuring the distance between a magnet and the sensors when a brake is fully engaged;
disposing the magnet on a brake lever wherein the magnet connects to the radio frequency control unit through contactless actuation;
mounting lights anywhere on the bicycle or on a bicyclist:
providing LED patterns comprising active patterns and passive patterns wherein the active patterns provide for multiple lights configured or chained together wirelessly and the passive patterns provide for one of five modes when a brake light is not on;
operating by a user left turn/right turn buttons disposed on the RF control unit to indicate turns;
activating the control unit by depressing the brake lever;
disposing a display unit on any surface visible to others; and
providing a wireless connection between the control unit and the display unit.

11. The method of claim 10 wherein the signaling provides the bicyclist to signal without dismounting from the bicycle.

12. The method of claim 10 wherein the signaling comprises the step of pressing the control unit until a tail light beeps.

13. The method of claim 12 wherein the signaling further comprises the step of the sensors disposed in the control unit sending a signal to discover the distance between the magnet and the plurality of sensors.

14. The method of claim 10 further comprising activating the magnet by the control unit.

15. The method of claim 10 further comprising activating the display unit by depressing the brake lever, while stationary, decelerating or accelerating.

* * * * *